(12) United States Patent
Bong

(10) Patent No.: US 9,347,418 B2
(45) Date of Patent: May 24, 2016

(54) METHOD OF MONITORING EGR SYSTEM

(71) Applicant: Hyundai Motor Company, Seoul (KR)

(72) Inventor: Ha Dong Bong, Ansan-Si (KR)

(73) Assignee: Hyundai Motor Company, Seoul (KR)

( * ) Notice: Subject to any disclaimer, the term of this patent is extended or adjusted under 35 U.S.C. 154(b) by 228 days.

(21) Appl. No.: 14/096,561

(22) Filed: Dec. 4, 2013

(65) Prior Publication Data

US 2015/0040862 A1 Feb. 12, 2015

(30) Foreign Application Priority Data

Aug. 9, 2013 (KR) ........................ 10-2013-0094798

(51) Int. Cl.
| F02P 5/145 | (2006.01) |
| F02D 41/22 | (2006.01) |
| F02P 5/15 | (2006.01) |
| F02P 5/152 | (2006.01) |
| F02M 25/07 | (2006.01) |
| F02D 35/02 | (2006.01) |

(Continued)

(52) U.S. Cl.
CPC .............. *F02P 5/145* (2013.01); *F02D 35/027* (2013.01); *F02D 37/02* (2013.01); *F02D 41/22* (2013.01); *F02D 41/221* (2013.01); *F02M 25/0702* (2013.01); *F02M 25/0726* (2013.01); *F02P 5/152* (2013.01); *F02P 5/1516* (2013.01); *F02D 41/0072* (2013.01); *F02D 41/2451* (2013.01); *Y02T 10/46* (2013.01)

(58) Field of Classification Search
CPC ..... F02D 35/00; F02D 35/0007; F02D 35/02; F02D 35/028; F02D 41/0065; F02M 25/0702; F02M 25/0726; F02M 2025/0769; F02P 5/145; F02P 5/1516; F02P 5/152

USPC ............ 123/568.16, 568.21, 406.13, 406.21, 123/406.24, 406.32, 406.35, 406.48; 701/107, 108, 110, 111
See application file for complete search history.

(56) References Cited

U.S. PATENT DOCUMENTS 4,819,603 A * 4/1989 Morita .................. F02P 5/1522
123/406.21
6,152,118 A * 11/2000 Sasaki ..................... F02D 21/08
123/568.21

(Continued)

FOREIGN PATENT DOCUMENTS

JP 6-200833 A 7/1994
JP 2010053719 A * 3/2010 ............ Y02T 10/121

(Continued)

*Primary Examiner* — Stephen K Cronin
*Assistant Examiner* — Kevin R Steckbauer
(74) *Attorney, Agent, or Firm* — Morgan, Lewis & Bockius LLP

(57) ABSTRACT

A method of monitoring an EGR system includes setting up an ignition timing map depending on EGR efficiency when the EGR system operates normally. An output value reflecting the driving state of a vehicle is divided into an active area and an inactive area. A detected value of ignition timing depending on the occurrence of knocking for the active and inactive areas is learned and stored. When knocking occurs in the active area, a corrected value of ignition timing influenced by only the operation of the EGR system is extracted using the difference between the detected values of ignition timing learned in the active and inactive areas. The amount of variation in the EGR efficiency influenced by the operation of the EGR system is measured by measuring the EGR efficiency by applying the corrected value of ignition timing to the ignition timing map.

9 Claims, 5 Drawing Sheets

(51) Int. Cl.
*F02D 37/02* (2006.01)
*F02D 41/00* (2006.01)
*F02D 41/24* (2006.01)

(56) References Cited

U.S. PATENT DOCUMENTS

| | | | | |
|---|---|---|---|---|
| 7,043,993 | B2 * | 5/2006 | Hayashi | G01K 7/22 |
| | | | | 374/E7.028 |
| 8,918,269 | B2 * | 12/2014 | Irie | F02D 41/0062 |
| | | | | 123/406.44 |
| 2013/0186374 | A1 * | 7/2013 | Anzawa | F02D 37/02 |
| | | | | 123/518 |
| 2015/0142338 | A1 * | 5/2015 | Nakano | F02D 41/0065 |
| | | | | 702/35 |

FOREIGN PATENT DOCUMENTS

| | | | | | |
|---|---|---|---|---|---|
| JP | 2010-221752 | A | | 10/2010 | |
| JP | 2011-149396 | A | | 8/2011 | |
| JP | 2012087676 | A | * | 5/2012 | ............ Y02T 10/121 |
| JP | 5033254 | B1 | * | 9/2012 | .............. Y02T 10/46 |
| JP | 2012241577 | A | * | 12/2012 | .............. Y02T 10/46 |
| JP | 2013-108414 | A | | 6/2013 | |
| KR | 2003-0003528 | A | | 1/2003 | |
| KR | 10-2006-0069627 | A | | 6/2006 | |
| KR | 10-0962849 | B1 | | 6/2010 | |

* cited by examiner

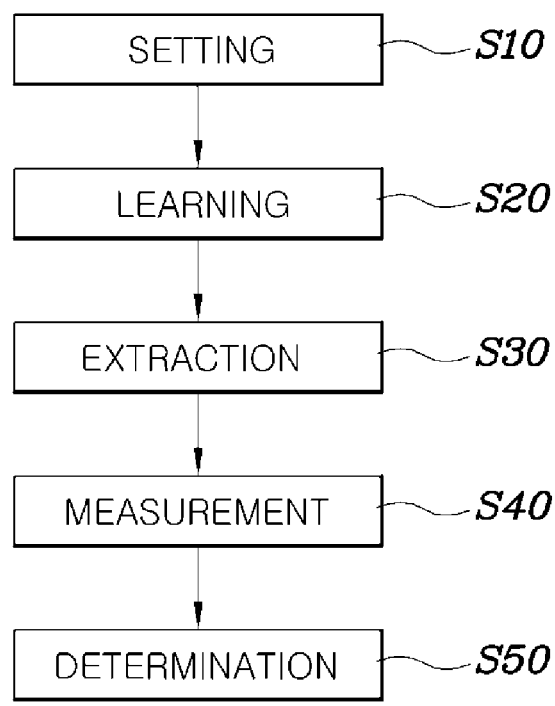

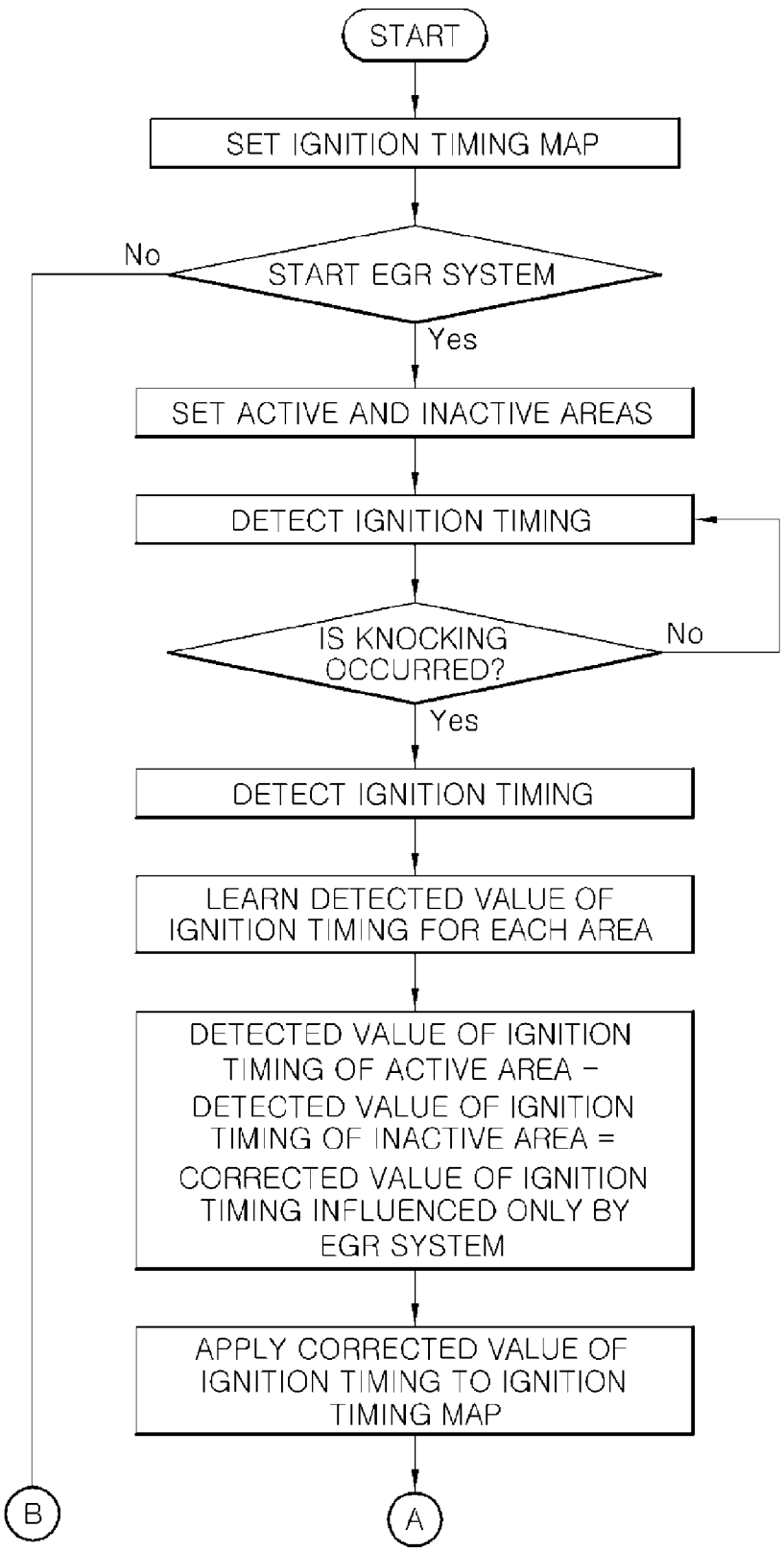

METHOD OF MONITORING EGR SYSTEM

CROSS-REFERENCE TO RELATED APPLICATION

The present application claims priority of Korean Patent Application Number 10-2013-0094798 filed Aug. 9, 2013, the entire contents of which application is incorporated herein for all purposes by this reference.

BACKGROUND OF INVENTION

1. Field of Invention

The present invention relates, in general, to a method of monitoring an exhaust gas recirculation (EGR) system, and more particularly, to a method of monitoring an EGR system which monitors the efficiency of an EGR cooler and whether or not an EGR ratio is abnormal by separating and extracting a corrected value of ignition timing detected in response to the operation of the EGR system from a value of ignition timing detected at knocking, whereby a temperature sensor for monitoring the efficiency of the EGR cooler and monitoring whether or not the EGR ratio is abnormal is removed.

2. Description of Related Art

In general, the object of applying an exhaust gas recirculation (EGR) cooler in an EGR system is to lower the temperature of EGR gas through the EGR cooler so that the cooled EGR gas enters a combustion chamber to thereby lower the temperature of the combustion chamber. This reduces the area where knocking may occur and thus advances ignition timing to increase torque, thereby improving fuel efficiency.

In EGR systems, a very important control factor in several aspects is to control the temperature of EGR gas. Recent EGR systems are configured such that the temperature of the EGR gas is lowered using the EGR cooler.

When the amount of exhaust gas that is discharged is changed due to clogging of the EGR cooler, it is required to monitor the clogging of the EGR cooler since it is regulated by the on-board diagnostics (OBD). The clogging of the EGR cooler is monitored using a mass airflow (MAF) sensor disposed at the front end of a manifold absolute pressure (MAP) sensor.

The efficiency of the EGR cooler is a factor defined in the OBD regulations. In order to satisfy error code monitoring regulations on exhaust gas by the CARB of North America and EOBD monitoring regulations enforced in Europe, temperature sensors are disposed at the front and rear ends of the EGR cooler. The temperature sensors measure and compare the temperatures of EGR gas before and after passing through the EGR cooler, thereby monitoring the efficiency of the EGR cooler.

However, when the two temperature sensors are additionally disposed at the front and rear ends of the related-art EGR system together with the MAF sensor in order to monitor the clogging of the EGR cooler and the efficiency of the EGR cooler as such, the cost of components required for disposing the temperature sensors and the number of process steps required for mounting the temperature sensors are increased, thereby increasing the entire cost, which is problematic.

In addition, Korean Laid-Open Patent Publication No. 10-2006-0069627 also disclosed "METHOD OF CONTROLLING EGR COOLER."

However, this method also requires a temperature sensor to be disposed in the EGR system. Accordingly, the problems of the increased cost of parts and the increased number of process steps cannot be overcome.

The information disclosed in this Background section is only for enhancement of understanding of the general background of the invention and should not be taken as an acknowledgement or any form of suggestion that this information forms the prior art already known to a person skilled in the art.

BRIEF SUMMARY

Accordingly, the present invention has been made keeping in mind the above problems occurring in the related art, and the present invention is intended to propose a method of monitoring an exhaust gas recirculation (EGR) system which monitors the efficiency of an EGR cooler and whether or not the EGR ratio is abnormal by separating and extracting a corrected value of ignition timing detected in response to the operation of the EGR system from a value of ignition timing detected at knocking, whereby it is possible to monitor the efficiency of the EGR cooler and to monitor whether or not the EGR ratio is abnormal without using a temperature sensor.

Various aspects of the present invention provide for a method of monitoring an EGR system. The method includes the steps of setting up an ignition timing map depending on EGR efficiency when the EGR system operates normally; dividing an output value that reflects the driving state of a vehicle into an active area where the EGR system operates and an inactive area where the EGR system does not operate, and learning and storing a detected value of ignition timing depending on the occurrence of knocking for each of the active and inactive areas; extracting, when knocking occurs in the active area, a corrected value of ignition timing influenced by only the operation of the EGR system using the difference between the detected value of ignition timing learned in the active area and the detected value of ignition timing learned in the inactive area; and measuring the amount of variation in the EGR efficiency influenced by the operation of the EGR system by measuring the EGR efficiency with respect to the corrected value of ignition timing by applying the corrected value of ignition timing to the ignition timing map.

According to various aspects of the present invention, the output value that reflects the driving state of the vehicle may be a function of the number of revolutions of an engine and the load.

The detected value of ignition timing that is learned and stored at the step of learning and storing the detected value of ignition timing may be an average of detected values of ignition timing that are learned and stored according to each of the active and inactive areas.

The detected value of ignition timing that is learned and stored at the step of learning and storing the detected value of ignition timing may be an average of detected values of ignition timing that are learned and stored at a predetermined number of cylinders of an engine.

The step of extracting the corrected value of ignition timing may include extracting the corrected value of ignition timing by subtracting the detected value of ignition timing learned and stored in the inactive area from the detected value of ignition timing learned and stored in the active area.

The inactive area may include a plurality of inactive sections. The detected value of ignition timing learned in the inactive area may be an average of detected values of ignition timing learned in the plurality of inactive sections.

The method may further include the step of, after the step of measuring the amount of variation in the EGR efficiency, determining whether a reason for correction of the ignition timing is either abnormality in an EGR ratio or abnormality in the efficiency of the EGR cooler using the difference between the temperature of fresh air measured at an upstream end of an intake line and the temperature of mixture air containing the fresh air and EGR gas measured at a downstream end of the intake line.

The step of measuring the amount of variation in the EGR efficiency may include a first temperature measuring step of measuring the temperature of the fresh air and a second temperature measuring step of measuring the temperature of the mixture gas in which the fresh air and the EGR gas are mixed. The step of determining the reason for correction of the ignition timing may include a first abnormality determining step of determining that the efficiency of the EGR cooler is abnormal when a difference of the second temperature from the first temperature is a reference value or greater and a second abnormality determining step of determining that the EGR ratio is abnormal when the difference of the second temperature from the first temperature is less than the reference value.

The temperature of the fresh air may be measured inside an air cleaner by a first sensor that can concurrently measure temperature and pressure. The temperature of the EGR mixture gas in which the fresh air and the EGR gas are mixed may be measured inside a surge tank by a second sensor that can concurrently measure temperature and pressure.

The second abnormality determining step may further include a third abnormality determining step of determining abnormality in which an EGR valve is not closed when an engine disorder is detected in a low-load state where the number of revolutions of an engine is a preset number of revolutions or less or in an idling state.

The engine disorder may be detected by a crank angle sensor.

According to the present invention as set forth above, when knocking occurs in the area in which the EGR system operates, the corrected value of ignition timing caused by the influence of knocking by the EGR system is separated, extracted, and applied to the ignition timing map. Variations in the EGR efficiency caused only by the influence of the operation of the EGR system are measured, whereby a decrease in the efficiency of the EGR cooler and a decrease in the EGR ratio are monitored. In addition, it is possible to monitor that abnormality in the EGR system is caused by the efficiency of the EGR cooler or the EGR ratio using the difference in temperature between fresh air and EGR mixture gas.

Furthermore, the efficiency of the EGR cooler and the EGR ratio, which are defined by regulations, are monitored through the control of the system without a temperature sensor for measuring the temperature of EGR gas, thereby achieving a cost saving effect.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a view schematically showing an exemplary method of monitoring an EGR system according to the present invention;

FIG. 2A is a flowchart illustrating the flow of the exemplary method of monitoring an EGR system according to the present invention;

DETAILED DESCRIPTION

Figure 2B:
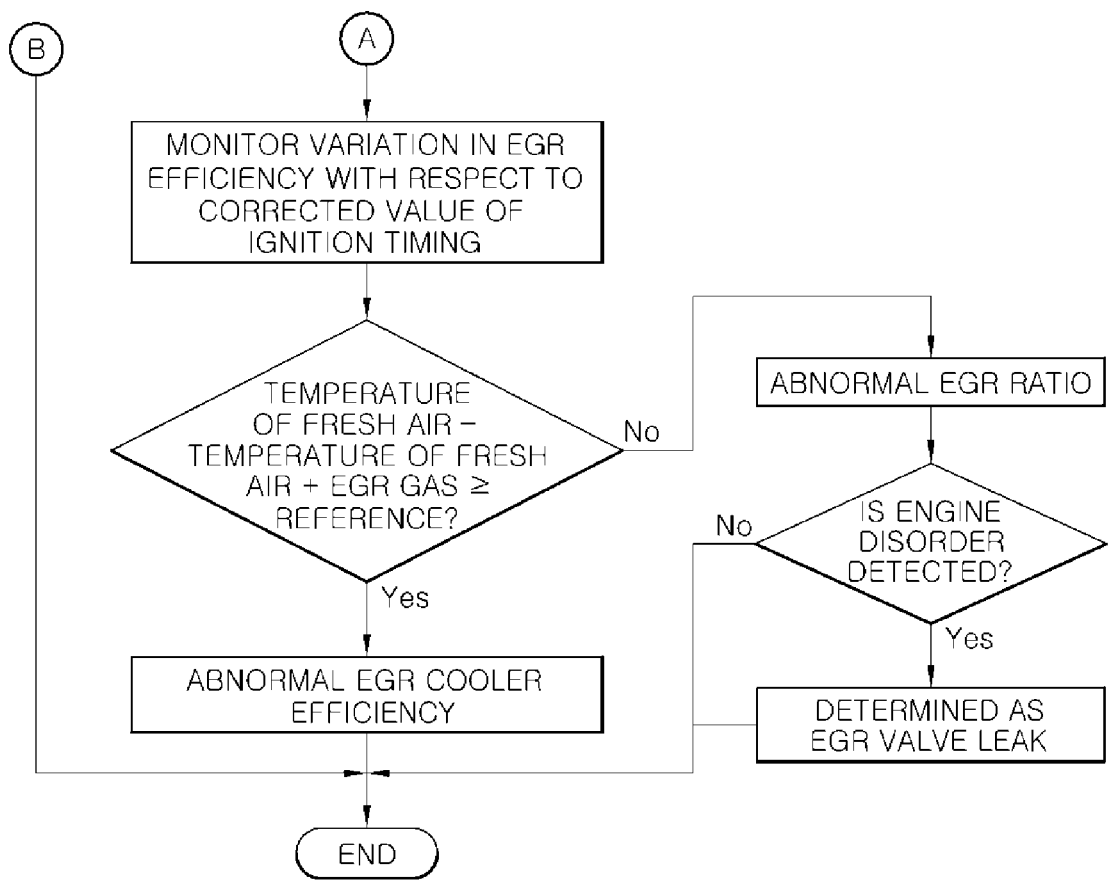
FIG. 2B is a continued flowchart of FIG. 2A

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Wherever possible, the same reference numerals will be used throughout the drawings and the description to refer to the same or like parts.

FIG. 1 is a view schematically showing a method of monitoring an EGR system according to various embodiments of the invention, and FIGS. 2A and 2B are flowcharts illustrating the flow of the method of monitoring an EGR system according to various embodiments of the invention.

The method of monitoring an EGR system according to various embodiments of the present invention will be described in detail with reference to FIG. 1. The method includes a setting step S10, a learning step S20, an extracting step S30 and a measuring step S40. The setting step S10 sets up an ignition timing map depending on EGR efficiency when the EGR system operates normally. The learning step S20 divides an output value that reflects the driving state of a vehicle into an active area where the EGR system operates and an inactive area where the EGR system does not operate, and learns and stores a detected value of ignition timing depending on the occurrence of knocking for each of the active and inactive areas. When knocking occurs in the active area, the extracting step S30 extracts a corrected value of ignition timing influenced by only the operation of the EGR system using the difference between the detected value of ignition timing learned in the active area and the detected value of ignition timing learned in the inactive area. The measuring step S40 measures the amount of variation in the EGR efficiency influenced by the operation of the EGR system by measuring the EGR efficiency with respect to the corrected value of ignition timing by applying the corrected value of ignition timing to the ignition timing map.

Specifically, the EGR cooler improves fuel efficiency by advancing the ignition timing by lowering the temperature of EGR gas that enters a cylinder. The ignition timing is generally increased by an angle of 10° or more compared to those of existing engines. However, when the amount of the EGR gas that enters is decreased due to a decrease in the efficiency of the EGR cooler or the EGR ratio, the temperature of the EGR gas that enters a combustion chamber increases. When the flow of the EGR gas is totally blocked, only fresh air is supplied into the combustion chamber. Consequently, the effect of advancing the ignition timing is decreased and knocking occurs.

In the actual driving environment of a vehicle, knocking is also caused by a variety of other conditions besides the influence of the EGR system, such as external driving conditions of a vehicle or fuel fed into the vehicle.

Accordingly, the driving state of the vehicle is divided into the active area where the EGR system operates and the inactive area where the EGR system does not operate. It can be appreciated that the influence of knocking that occurs in the active area where the EGR system operates is caused by a combination of the influence caused by the operation of the EGR system and the influence of knocking caused by external reasons.

Therefore, according to the invention, when knocking occurs in the active area where the EGR system operates, the influence of knocking caused by external reasons is removed from the influence of knocking caused by the combined reasons. Consequently, only the influence of knocking caused purely by the EGR system is separated, thereby extracting the corrected value of ignition timing at knocking caused by the EGR system.

Figure 4:
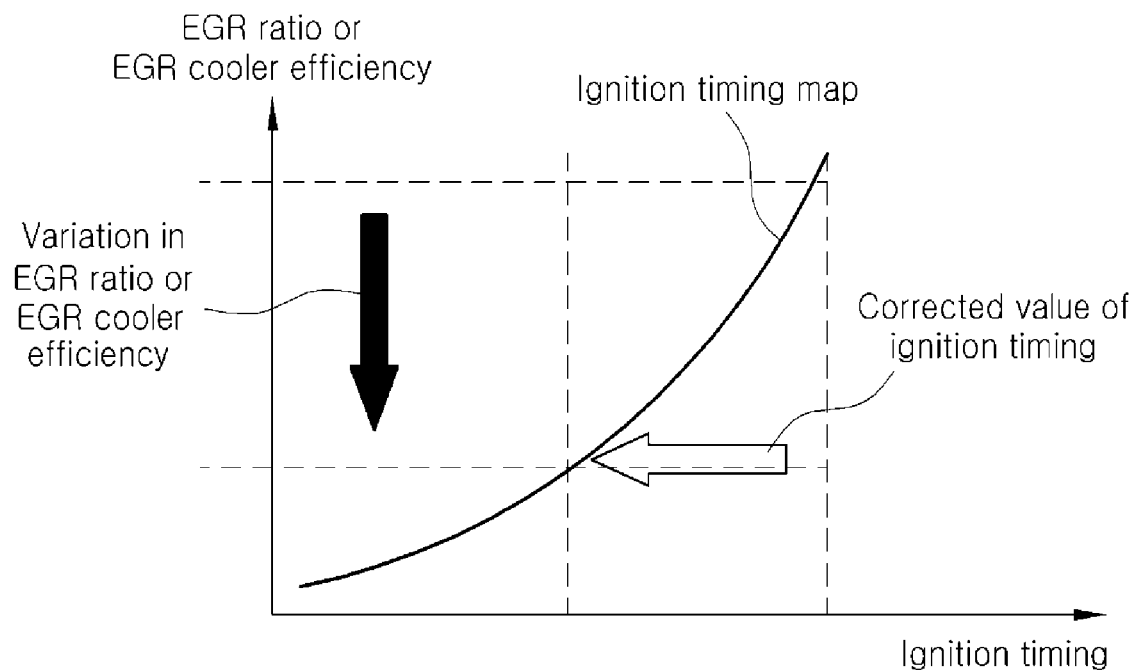
FIG. 4 is a view illustrating an exemplary method of measuring the amount of variation in EGR efficiency with respect to a corrected value of ignition timing by applying the corrected value of ignition timing to an ignition timing map depending on the EGR efficiency in the method of monitoring an EGR system according to the present invention.

When the corrected value of ignition timing is applied to the ignition timing map depending on the EGR efficiency as such, the amount of variation in the EGR efficiency caused by only the influence of the operation of the EGR system can be measured as shown in FIG. 4. Consequently, it is possible to monitor decreases in the efficiency of the EGR cooler and decreases in the EGR.

According to the present invention, an output value that reflects the driving state of the vehicle at the learning step S20 can be a function of the number of revolutions of the engine and the load.

Figure 3:
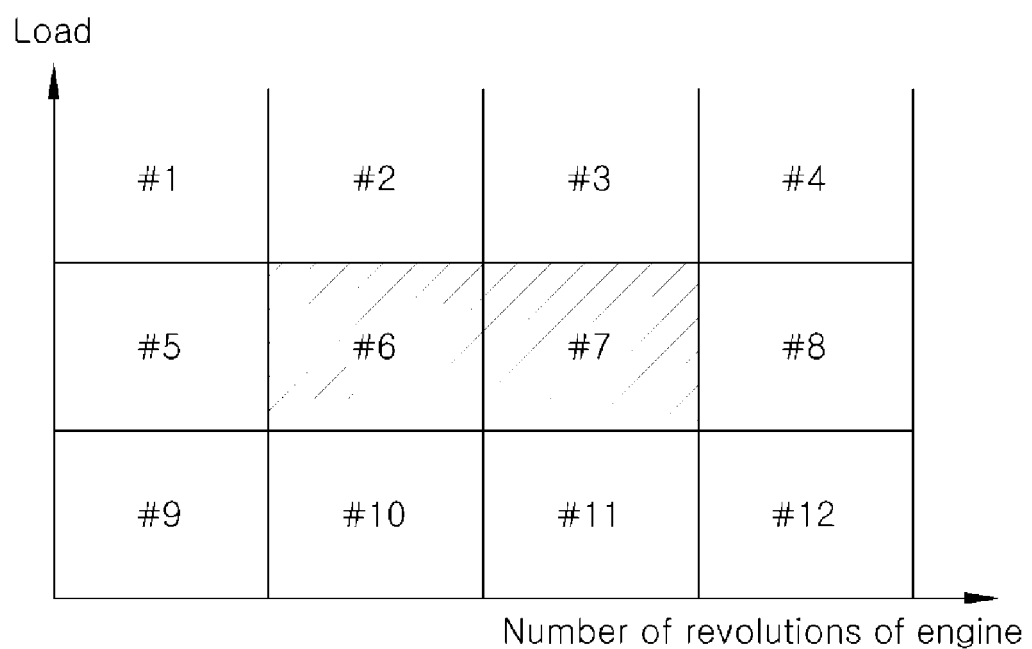
FIG. 3 is a view illustrating active and inactive areas of an exemplary EGR system according to the number of revolutions of an engine and the load in the method of monitoring an EGR system according to the present invention.

FIG. 3 is a view illustrating active and inactive areas of an EGR system according to the number of revolutions of an engine and the load in the method of monitoring an EGR system according to various embodiments of the invention.

Referring to FIG. 3, the driving state of a vehicle is divided into several areas depending on the number of revolutions of the engine and the load (The areas shown in FIG. 3 merely present simple examples).

In these areas, an active area where the EGR system operates can be some sections (#6 and #7 in FIG. 3), and the other sections can be an inactive area where the EGR system does not operate (#1 to #5 and #8 to #12 in FIG. 3). In mid-to-high load sections (#6 and #7 sections in FIG. 3) where knocking is loud, the EGR system operates in order to raise the fuel efficiency effect by removing knocking.

In contrast, in a high-load state (where the throttle is opened to the maximum), the negative pressure of a surge tank is weak. This makes it difficult for the EGR gas to enter, and the EGR cannot be used. In a low-load state, there is no gain in the advancement of ignition timing due to the entrance of the EGR gas, so that only the inner EGR is used. The EGR disclosed in this specification is external EGR referring to EGR gas that enters an intake line through an EGR line.

The amount of advancement in ignition timing that is learned and stored at the learning step S20 can be the average value of the amounts of advancement in ignition timing that are learned and stored for each section.

In addition, the amount of advancement in ignition timing that is learned and stored at the learning step S20 can be an average value of the amounts of advancement in ignition timing that are learned and stored at a specific number of cylinders of an engine.

That is, the amount of advancement in ignition timing can be learned or stored using an average value of the amounts of advancement in ignition timing of the active and inactive areas, or an average value of the amounts of advancement in ignition timing at a specific number of cylinders of an engine.

At the extracting step S30, a corrected value of ignition timing can be extracted by subtracting the detected value of ignition timing learned in the inactive area from the detected value of ignition timing learned in the active area.

Here, the amount of advancement in ignition timing learned in the inactive area can be an average of the amounts of advancement in ignition timing learned in the inactive area.

When knocking occurs in the active area where the EGR system operates as such, the influence of knocking caused by external reasons is removed from the influence of knocking caused by the combined reasons. Consequently, only the influence of knocking caused purely by the EGR system is separated, thereby extracting the corrected value of ignition timing at knocking caused by the EGR system.

In addition, after the measuring step S40, a determining step S50 can also be provided. The determining step S50 can determine whether the reason for correction of the ignition timing is either abnormality in the EGR ratio or abnormality in the efficiency of the EGR cooler using the difference between the temperature of fresh air measured at the upstream end of the intake line and the temperature of mixture air containing the fresh air and the EGR gas measured at the downstream end of the intake line.

Specifically, the measuring step S40 can include a first temperature measuring step of measuring the temperature of the fresh air and a second temperature measuring step of measuring the temperature of the mixture gas in which the fresh air and the EGR gas are mixed, and the determining step S50 can include a first abnormality determining step of determining that the efficiency of the EGR cooler is abnormal when the difference of the second temperature from the first temperature is a reference value or greater and a second abnormality determining step of determining that the EGR ratio is abnormal when the difference of the second temperature from the first temperature is less than the reference value.

When the difference between the temperature of fresh air and the temperature of the mixture air containing the fresh air and the EGR gas is measured to be higher than the reference value, the temperature of the mixture air is measured as relatively high. From this, it is determined that the EGR gas is not efficiently cooled since the efficiency of the EGR cooler is abnormal. When the difference between the temperature of fresh air and the temperature of the mixture air containing the fresh air and the EGR gas is measured to be lower than the reference value, the temperature of the mixture air is measured as relatively low. From this, it is determined that the efficiency of the EGR cooler is normal and the EGR ratio is lowered.

In addition, the temperature of the fresh air can be measured inside an air cleaner by a first sensor that can concurrently measure temperature and pressure, and the temperature of the EGR mixture gas in which the fresh air and the EGR gas are mixed can be measured inside the surge tank by a second sensor that can concurrently measure temperature and pressure.

Here, the first sensor can be an atmospheric pressure sensor that can concurrently measure temperature and pressure, and the second sensor can be an MAP sensor that can concurrently measure temperature and pressure.

In the present invention, the second abnormality determining step can further include a third abnormality determining step of determining abnormality in which the EGR valve is not closed when an engine disorder is detected in a low-load state where the number of revolutions of the engine is a preset number of revolutions or less or in an idling state.

Here, the engine disorder can be detected by a crank angle sensor.

When the EGR valve is not closed, in the area where a problem occurs, a large amount of the EGR gas is absorbed through the EGR valve that is not completely closed by the high negative pressure of the surge tank in the low-load or idling state, so that the large amount of the EGR gas enters the surge tank. This is one of causes that stop start-up due to unstable combustion.

Accordingly, the engine disorder is detected by monitoring variations in the roughness of the engine using the crank angle sensor in the low-load or idling state.

Therefore, when the difference between the temperature of the fresh air and the temperature of the EGR mixture gas is measured to be lower than the reference value and the engine disorder is detected by the crank angle sensor, it is determined that the EGR valve cannot be closed since carbon is situated between the EGR valve and the valve seat due to carbon accumulation in the EGR valve. Accordingly, it is possible to determine that the EGR gas leaks.

A reference will be made to a monitoring flow of the method of monitoring an EGR system according to the invention.

First, assuming that the EGR system normally operates, the ignition timing map depending on the EGR is set as shown in FIG. 4.

Afterwards, the load with respect to the number of revolutions of the engine during driving of a vehicle is divided into an active area where the EGR system operates and an inactive area where the EGR system does not operate. Here, the active and inactive areas can be divided depending on the actual operation of the EGR system.

In each area, depending on the driving state of the vehicle, knocking is detected by the knocking sensor. A knocking signal detected by the knocking sensor is transferred to a controller, which in turn detects and controls ignition timing in order to remove the knocking depending on the area where the vehicle has entered.

Here, the ignition timing detected and controlled in each area is continuously updated and is learned according to each area. An average of the detected values of ignition timing that are learned is newly set and stored as a detected value of ignition timing in the corresponding area.

Afterwards, when knocking occurs in the active area where the EGR system operates, a detected value of ignition timing learned and stored in the inactive area is subtracted from a detected value of ignition timing learned and stored in the active area, thereby extracting a corrected value of ignition timing that is detected and corrected by only the influence of the operation of the EGR system. Here, the detected value of ignition timing in the inactive area is the average of detected values of ignition timing in inactive sections.

Accordingly, the corrected value extracted of ignition timing is applied to the ignition timing map shown in FIG. 4, whereby the EGR efficiency with respect to the corrected value of ignition timing is measured. Therefore, it is possible to measure variations in the EGR efficiency due to the influence of the operation of the EGR system.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of monitoring an EGR system comprising:
    setting up an ignition timing map depending on EGR efficiency when the EGR system operates normally;
    dividing an output value that reflects a driving state of a vehicle into an active area where the EGR system operates and an inactive area where the EGR system does not operate, and by a controller, learning and storing a detected value of ignition timing depending on an occurrence of knocking for each of the active and inactive areas;
    extracting, when knocking occurs in the active area, a corrected value of ignition timing influenced by only the operation of the EGR system using a difference between the detected value of ignition timing learned in the active area and the detected value of ignition timing learned in the inactive area;
    measuring an amount of variation in the EGR efficiency influenced by the operation of the EGR system by measuring the EGR efficiency with respect to the corrected value of ignition timing by applying the corrected value of ignition timing to the ignition timing map; and
    after the process of measuring the amount of variation in the EGR efficiency, determining whether a reason for correction of the ignition timing is either abnormality in an EGR ratio or abnormality in the efficiency of the EGR cooler using a difference between a temperature of fresh air measured at an upstream end of an intake line and a temperature of mixture air containing the fresh air and EGR gas measured at a downstream end of the intake line,
    wherein the process of measuring the amount of variation in the EGR efficiency comprises a first temperature measuring step of measuring the temperature of the fresh air and a second temperature measuring step of measuring the temperature of the mixture gas in which the fresh air and the EGR gas are mixed, and
    wherein the process of determining the reason for correction of the ignition timing comprises a first abnormality determining step of determining that the efficiency of the EGR cooler is abnormal when a difference of the second temperature from the first temperature is a reference value or greater and a second abnormality determining step of determining that the EGR ratio is abnormal when the difference of the second temperature from the first temperature is less than the reference value.

2. The method according to claim 1, wherein the output value that reflects the driving state of the vehicle at the process of learning and storing the detected value of ignition timing comprises a function of a number of revolutions of an engine and a load.

3. The method according to claim 1, wherein the detected value of ignition timing that is learned and stored at the process of learning and storing the detected value of ignition timing comprises an average of detected values of ignition timing that are learned and stored according to each of the active and inactive areas.

4. The method according to claim 1, wherein the detected value of ignition timing that is learned and stored at the process of learning and storing the detected value of ignition timing comprises an average of detected values of ignition timing that are learned and stored at a predetermined number of cylinders of an engine.

5. The method according to claim 1, wherein the process of extracting the corrected value of ignition timing comprises extracting the corrected value of ignition timing by subtracting the detected value of ignition timing learned and stored in the inactive area from the detected value of ignition timing learned and stored in the active area.

6. The method according to claim 5, wherein the inactive area comprises a plurality of inactive sections, and the detected value of ignition timing learned in the inactive area comprises an average of detected values of ignition timing learned in the plurality of inactive sections.

7. The method according to claim 1, wherein the temperature of the fresh air is measured inside an air cleaner by a first sensor that can concurrently measure temperature and pressure, and the temperature of the EGR mixture gas in which the fresh air and the EGR gas are mixed is measured inside a surge tank by a second sensor that can concurrently measure temperature and pressure.

8. The method according to claim 1, wherein the second abnormality determining step further comprises a third abnormality determining step of determining abnormality in which an EGR valve is not closed when an engine disorder is detected in a low-load state where a number of revolutions of an engine is a preset number of revolutions or less or in an idling state.

9. The method according to claim 8, wherein the engine disorder is detectable by a crank angle sensor.

\* \* \* \* \*